(12.)

JOHN VAN TASSEL.

Pump Pistons.

No. 122,082.             Patented Dec. 19, 1871.

ATTEST.
Wm. H. Brereton Jr.
Walter Allen

INVENTOR.
John Van Tassel.
by Knight Bros
Attorneys

UNITED STATES PATENT OFFICE.

JOHN VAN TASSEL, OF TOLEDO, OHIO.

IMPROVEMENT IN PUMP-PISTONS.

Specification forming part of Letters Patent No. 122,082, dated December 19, 1871.

*To all whom it may concern:*

Be it known that I, JOHN VAN TASSEL, of Toledo, in the county of Lucas and State of Ohio, have invented a new and Improved Mode of Constructing Piston-Heads for Water and Air Pumps driven by steam-power or otherwise; and I do hereby declare that the following is a full and exact description thereof, reference being had to drawing accompanying this specification.

The nature of my invention consists in constructing a solid metal disk upon a piston-rod, to which it is fastened permanently, which disk is of a diameter a little less than the bore of the cylinder in which it is intended to be used, and having its lower section cut away about one-third its diameter, so as to receive flat rings of rubber as packing; the whole being held in place by another metal disk of the same diameter as the former, used as a cap, and held in place by a burr or nut screwed upon the lower end of the piston-rod; the rubber rings to be applied as packing, as follows: First, a ring or segment of rubber of the diameter of the bore of the cylinder; next, a ring of about one-fourth of an inch less diameter than the first; next, a ring of the same diameter as the first; next, a ring of the same diameter as the second; and so on alternately, so as to leave grooves around the piston-head so formed for the reception of sand or other foreign substance which may enter the cylinder, thus preventing the friction usual in using the piston-heads in general use, occasioned by the introduction of sand, &c., between the surfaces of the piston-head and cylinder.

Figure 1:
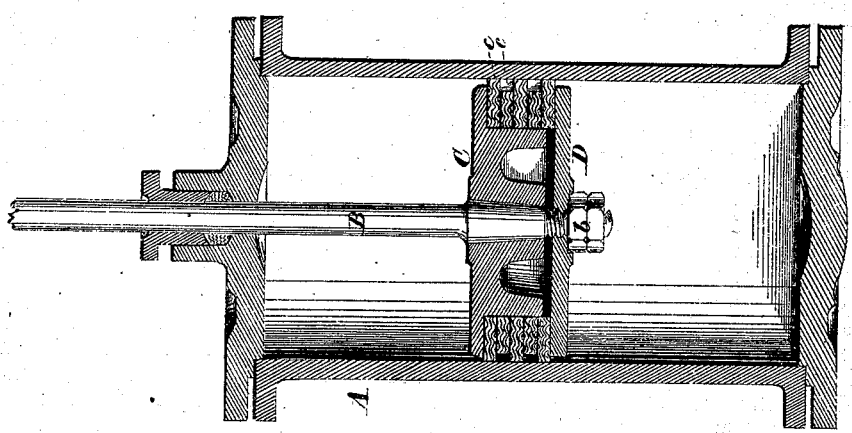
Figure 3:
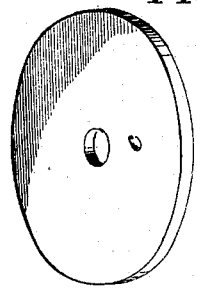
Figure 2:
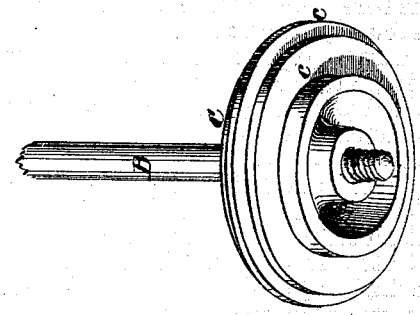

Figure 1 is a central vertical section. Fig. 2 is a perspective of the upper part of the piston-head, showing the arrangement of the rubber rings. Fig. 3 is a perspective of the follower detached.

To enable others skilled in the art to make and use my invention, I will proceed to describe its construction and operation.

I construct a cylinder, A, in any of the forms used for water or air-pumps. I then construct a piston-rod, B, with a solid metal head, C, the rod extending through the head to the depth desired for the thickness of the piston-head, the piston-head disk so constructed to be of such diameter as to play easily in the bore of the cylinder. The disk so described to be cut away, excepting the upper part thereof, about one-third its diameter, for the reception of flat rubber rings or segments $c$ $c$, the center of which to be cut out so as to fit upon the metal shoulder of said disk. These rubber rings are arranged upon said shoulder in such a manner, of two sizes put on alternately, until the last ring faces a little lower than the lower face of the disk above described. Then another metal disk, D, of the same diameter as the first, having its center cut out so as to receive the lower end of the piston-rod, is put on to keep the rubber rings in place, and a nut or burr, $b$, fitted to run upon a thread cut upon the lower end of the piston-rod, is put on and turned up so tight that the elasticity of the rubber will prevent its working off; the whole, when completed, consisting of a piston-rod with a piston-head attached, which head consists of two metal disks with rubber rings of different sizes alternating in such a manner between said disks, so that such piston-head, when completed, will contain grooves at intervals for the reception of sand or other foreign substance finding its way into the cylinder, and can be cleaned when foul by removing the lower metal disk and rubber bands, thus saving much of the friction usually accompanying the use of the form of piston-head now in use.

What I claim as my invention, and desire to secure by Letters Patent, is—

The solid metal piston-head, constructed as herein shown and described, consisting of the recessed part and follower with the alternate rings of different sizes of metal and rubber, or other suitable elastic material, clamped between them by means of the screw and nuts on the end of the piston-rod.

JOHN VAN TASSEL.

Witnesses:
EDWARD H. KNIGHT,
OCTAVIUS KNIGHT.

(12)